US010723024B2

(12) United States Patent
Konidaris et al.

(10) Patent No.: US 10,723,024 B2
(45) Date of Patent: Jul. 28, 2020

(54) SPECIALIZED ROBOT MOTION PLANNING HARDWARE AND METHODS OF MAKING AND USING SAME

(71) Applicant: Duke University, Durham, NC (US)

(72) Inventors: George D. Konidaris, Durham, NC (US); Daniel J. Sorin, Durham, NC (US)

(73) Assignee: DUKE UNIVERSITY, Durham, NC (US)

(*) Notice: Subject to any disclaimer, the term of this patent is extended or adjusted under 35 U.S.C. 154(b) by 115 days.

(21) Appl. No.: 15/546,441

(22) PCT Filed: Jan. 5, 2016

(86) PCT No.: PCT/US2016/012204
§ 371 (c)(1),
(2) Date: Jul. 26, 2017

(87) PCT Pub. No.: WO2016/122840
PCT Pub. Date: Aug. 4, 2016

(65) Prior Publication Data
US 2018/0001472 A1 Jan. 4, 2018

Related U.S. Application Data

(60) Provisional application No. 62/107,755, filed on Jan. 26, 2015.

(51) Int. Cl.
B25J 9/16 (2006.01)
G06N 7/00 (2006.01)

(52) U.S. Cl.
CPC ............ B25J 9/1666 (2013.01); G06N 7/005 (2013.01); G05B 2219/40429 (2013.01);
(Continued)

(58) Field of Classification Search
CPC ........ B25J 9/1666; B25J 9/161; B25J 9/1664; B25J 9/1676; G06N 7/005;
(Continued)

(56) References Cited

U.S. PATENT DOCUMENTS 4,862,373 A 8/1989 Meng
4,949,277 A * 8/1990 Trovato ................. B25J 9/1666
700/254

(Continued)

FOREIGN PATENT DOCUMENTS

EP 2306153 A2 4/2011
EP 3 250 347 A1 12/2017
(Continued)

OTHER PUBLICATIONS or.pdf (Or | Definition of Or by Merriam-Webster, Sep. 9, 2019, https://www.merriam-webster.com/dictionary/or, pp. 1-12) (Year: 2019).*

(Continued)

Primary Examiner — Bao Long T Nguyen
(74) Attorney, Agent, or Firm — Talem IP Law, LLP

(57) ABSTRACT

Specialized robot motion planning hardware and methods of making and using same are provided. A robot-specific hardware can be designed using a tool that receives a robot description comprising a collision geometry of a robot, degrees of freedom for each joint of the robot, and joint limits of the robot; receives a scenario description; generates a probabilistic roadmap (PRM) using the robot description and the scenario description; and for each edge of PRM, produces a collision detection unit comprising a circuit indicating all parts of obstacles that collide with that edge. The hardware is implemented as parallel collision detection (Continued)

units that provide collision detection results used to remove edges from the PRM that is searched to find a path to a goal position.

25 Claims, 7 Drawing Sheets

(52) U.S. Cl.
CPC ... *G05B 2219/40476* (2013.01); *Y10S 901/02* (2013.01); *Y10S 901/49* (2013.01)

(58) Field of Classification Search
CPC .......... G05B 2219/40429; G05B 2219/40476; G05B 2219/39092; G05B 2219/40519; Y10S 901/02; Y10S 901/49
USPC ....................................... 700/255; 901/2, 49
See application file for complete search history.

(56) References Cited

U.S. PATENT DOCUMENTS

| | | | |
|---|---|---|---|
| 6,049,756 A * | 4/2000 | Libby | G06T 19/003 318/587 |
| 7,865,277 B1 | 1/2011 | Larson et al. | |
| 8,666,548 B2 | 5/2014 | Lim | |
| 8,825,207 B2 | 9/2014 | Kim et al. | |
| 8,855,812 B2 | 10/2014 | Kapoor | |
| 9,731,724 B2 | 8/2017 | Yoon | |
| 2005/0071048 A1 | 3/2005 | Watanabe et al. | |
| 2005/0216181 A1 | 9/2005 | Estkowski et al. | |
| 2006/0247852 A1 | 11/2006 | Kortge et al. | |
| 2007/0112700 A1 | 5/2007 | Den Haan et al. | |
| 2008/0125893 A1 | 5/2008 | Tilove et al. | |
| 2008/0234864 A1 | 9/2008 | Sugiura et al. | |
| 2009/0192710 A1 | 7/2009 | Eidehall et al. | |
| 2009/0326711 A1 | 12/2009 | Chang et al. | |
| 2009/0326876 A1 | 12/2009 | Miller | |
| 2010/0235033 A1 | 9/2010 | Yamamoto et al. | |
| 2011/0153080 A1 | 6/2011 | Shapiro et al. | |
| 2012/0010772 A1 | 1/2012 | Pack et al. | |
| 2014/0025203 A1 | 1/2014 | Inazumi | |
| 2014/0121833 A1 * | 5/2014 | Lee | B25J 9/1666 700/255 |
| 2014/0147240 A1 | 5/2014 | Noda et al. | |
| 2014/0251702 A1 * | 9/2014 | Berger | B25J 5/007 180/21 |
| 2014/0309916 A1 | 10/2014 | Bushnell | |
| 2015/0051783 A1 | 2/2015 | Tamir et al. | |
| 2015/0261899 A1 | 9/2015 | Atohira et al. | |
| 2015/0266182 A1 | 9/2015 | Strandberg | |
| 2016/0001775 A1 | 1/2016 | Wilhelm et al. | |
| 2016/0107313 A1 | 4/2016 | Hoffman et al. | |
| 2016/0357187 A1 | 12/2016 | Ansari | |
| 2017/0120448 A1 | 5/2017 | Lee et al. | |
| 2017/0146999 A1 | 5/2017 | Cherepinsky et al. | |
| 2017/0157769 A1 | 6/2017 | Aghamohammadi et al. | |
| 2017/0168485 A1 | 6/2017 | Bemtorp et al. | |
| 2017/0305015 A1 | 10/2017 | Krasny et al. | |
| 2018/0001472 A1 | 1/2018 | Konidaris et al. | |
| 2018/0074505 A1 | 3/2018 | Lv et al. | |

FOREIGN PATENT DOCUMENTS

| | | |
|---|---|---|
| JP | 11-249711 A | 9/1999 |
| JP | 11-296229 A | 10/1999 |
| JP | 2002-073130 A | 3/2002 |
| JP | 2008-65755 A | 3/2008 |
| JP | 2010-061293 A | 3/2010 |
| JP | 2011-75382 A | 4/2011 |
| JP | 2012190405 A | 10/2012 |
| JP | 2012-243029 A | 12/2012 |
| JP | 2014-184498 A | 10/2014 |
| JP | 2015-517142 A | 6/2015 |
| JP | 2018-505788 A | 3/2018 |
| KR | 10-2017-0018564 A | 2/2017 |
| WO | 99/24914 A1 | 5/1999 |
| WO | 2017/214581 A1 | 12/2017 |

OTHER PUBLICATIONS

Kavraki et al. (Lydia E. Kavraki, Petr Svestka, Jean-Claude Latombe, and Mark H. Overmars, Probabilistic Roadmaps for Path Planning in High-Dimensional Configuration Spaces, Aug. 1996, IEEE, pp. 566-580; (Year: 1996).*

"International Search Report and Written Opinion Issued in PCT Application No. PCT/US2016/012204", dated Mar. 21, 2016, 10 Pages.

"International Search Report and Written Opinion Issued in PCT Application No. PCT/US2017/36880", dated Oct. 10, 2017, 15 Pages.

Kavraki et al., "Probabilistic Roadmaps for Path Planning in High-Dimensional Configuration Spaces," IEEE Transactions on Robotics and Automation, Aug. 1996, pp. 566-580, vol. 12, No. 4.

Atay et al., "A Motion Planning Processor on Reconfigurable Hardware," All Computer Science and Engineering Research, Sep. 23, 2005, 13 Pages, Report No. WUCSE-2005-46, Department of Computer Science & Engineering—Washington University in St. Louis, St. Louis, MO.

Second Office Action Issued In Japanese Patent Application No. 2017-557268, dated Feb. 26, 2019, 5 Pages.

Invitation to Pay Additional Fees and, Where Applicable, Protest Fee Issued in PCT/US17/36880, dated Aug. 14, 2017, 2 pages.

Sean Murray et al., "The microarchitecture of a real-time robot motion planning accelerator", 2016 49th Annual IEEE/ACM International Symposium on Microarchitecture (Micro), IEEE, Oct. 15, 2016, 12 pages.

Extended European Search Report Issued in European Application No. 18209405.2, dated Aug. 2, 2019, 10 Pages.

International Search Report and Written Opinion Issued in International Application No. PCT/US2019/023031, dated Aug. 14, 2019, 19 pages.

International Search Report and Written Opinion Issued in International Application No. PCT/US2019/016700, dated May 20, 2019, 14 pages.

"First Office Action Issued in Japanese Patent Application No. 2017-557268", dated Aug. 7, 2018, 15 Pages.

Hauck, Scott et al. "Configuration Compression for the Xilinx XC6200 FPGA," IEEE Transactions on Computer-Aided Design of Integrated Circuits and Systems, vol. 18, No. 8, Aug. 1999, 8 Pages.

Niuzhet, Atay and Bayazit, Burchan, "A Motion Planning Processor on Reconfigurable Hardware," Washington University, Department of Computer Science & Engineering, Sep. 23, 2005, 14 Pages.

Rodriguez, Carlos et al. "Planning Manipulation movements of a Dual-Arm System Considering Obstacle removing," Robotics and Autonomous Systems, Elsevier Science Publishers, Amsterdam, NL, vol. 62, No. 12, Aug. 1, 2014, 11 Pages.

"Extended European Search Report Issued in European Application No. 16743821.7", dated Apr. 10, 2018, 9 Pages.

Extended European Search Report Issued in European Application No. 17811131.6, dated Apr. 24, 2019, 16 Pages.

Sean Murray et al., "Robot Motion Planning on a Chip", Robotics: Science and Systems 2016, Jun. 22, 2016, 9 pages.

International Search Report and Written Opinion Issued in PCT/US2019/012209, dated Apr. 25, 2019, 26 pages.

International Search Report and Written Opinion Issued in International Application No. PCT/US2019/045270, dated Nov. 25, 2019, 13 pages.

Office Action Issued in Japanese Application No. 2018-564836, dated Dec. 3, 2019, 3 Pages.

Mike Stilman et al., "Manipulation Planning Among Movable Objects", Proceedings of the IEEE Int. Conf. on Robotics and Automation (ICRA '07), Apr. 2007, 6 pages.

David E. Johnson et al., "Bound Coherence for Minimum Distance Computations", Proceedings of the 1999 IEEE International Conference on Robotics & Automation, May 1999, 6 pages.

(56) References Cited

OTHER PUBLICATIONS

International Search Report and Written Opinion issued in PCT/US2019/064511, dated Mar. 27, 2020, 12 pages.
Office Action Issued in Japanese Application No. 2018-564836, dated May 19, 2020, 3 Pages.
Non-Final Office Action Issued in U.S. Appl. No. 16/308,693, dated Jun. 1, 2020, 16 pages.

* cited by examiner

```
assign Edge = (!A&B&C&D&!E&!F&G&!H&!I&!J&K&L&!M&!N&O) |
(!A&B&C&!D&E&!F&!G&!H&!J&K&L&M&!N&!O) | (A&!B&!C&!D&!F&G&!H&!I&!J&K&L&!M&!N&O)
| (!A&B&C&E&!F&!G&!H&!I&J&K&!L&M&N&O) | (!A&B&C&D&E&!F&G&!H&!I&!J&K&L&!M&O) |
(!A&B&C&!D&E&!F&!G&!H&!I&K&L&M&!N&!O) | (A&!B&!C&!D&!F&G&!H&!I&!J&K&L&!M&N&!O)
| (!A&B&C&D&!F&G&!H&!I&!J&K&L&!M&N&!O) |
(A&!B&!C&!D&!E&!F&!G&H&!I&!J&K&L&!N&!O) | (A&B&!C&D&E&!F&!G&!I&!J&K&!L&!M&!N&O)
| (!A&B&C&D&D&!F&!G&!H&!I&!J&!K&L&M&O) | (!A&B&C&D&!E&!F&!G&!H&I&!J&K&!L&M&N) |
(!A&B&C&D&!F&!G&H&I&J&K&L&!M&!O) | (!A&B&C&D&!F&!G&!H&!I&!J&!K&L&M&N) |
(!A&B&C&D&!F&!G&!H&!I&!K&L&M&N&O) | (!A&B&C&D&E&!F&!G&!H&!I&!J&L&M&N) |
(!A&B&C&D&E&!F&!G&!H&!I&K&M&!N&O) | (!A&B&C&!D&E&!F&!G&!H&I&!J&K&L&!M) |
(A&!B&!C&!D&!E&!F&!H&!I&!J&K&L&!M&N) | (A&B&!C&E&!F&!G&!H&!J&K&!L&!M&N&!O) |
(!A&B&C&D&!E&!F&!G&!H&!I&K&L&M&!N) | (A&B&!C&!D&E&!F&!G&!I&!J&K&!L&!M&N) |
(A&B&!C&D&E&!F&!G&!H&K&!L&!M&!N&O) | (A&B&!C&D&!E&!F&!G&!I&!J&K&!L&!M&N) |
(A&!B&!C&!D&!E&!F&!G&!H&!I&K&L&M&N&O) | (A&B&!C&E&!F&!G&!H&!I&K&!L&!M&N&!O) |
(!A&B&C&D&E&!F&!G&!H&I&K&!L&M&N) | (!A&B&C&D&!F&!G&!I&!J&K&!L&N&O) |
(!A&B&C&D&!F&!G&!H&I&K&M&!N&!O) | (A&!B&!C&!D&!F&!G&!H&I&J&K&L&!M&O) |
(!A&B&C&D&!F&!G&!H&I&!J&K&M&!N) | (!A&B&C&E&!F&!G&!H&!I&J&K&L&!M) |
(!A&B&C&D&!F&!G&H&J&K&L&!M&!N) | (A&B&C&!D&!F&!G&!H&!I&!J&K&!L&M&N) |
(A&B&C&!D&E&!F&!G&!H&!I&K&!L&M&N) | (!A&B&C&D&!F&!G&H&K&!L&M&N&O) |
(A&!B&!C&!D&!F&!G&H&!I&!J&K&L&!M&N) | (A&!B&!C&!D&!F&!G&H&!I&!J&K&L&!M&O) |
(!A&B&C&D&!F&!G&H&!J&K&L&!M&!O) | (!A&B&C&D&!F&!G&H&!J&K&!L&M&N) |
(!A&B&C&D&E&!F&!G&!H&K&!L&!M&O) | (!A&B&C&D&!F&!G&!H&I&J&K&!L&!N) |
(!A&B&C&E&!F&!G&!H&!I&K&L&!M&O) | (!A&B&C&D&!F&!G&!H&K&!L&!M&!N&!O) |
(!A&B&C&D&!F&!G&H&K&!L&!M&N&O) | (!A&B&C&D&!E&!F&!G&!H&!I&K&!L&!M) |
(A&B&!C&D&!E&!F&!G&!H&K&!L&!M&N) | (A&!B&!C&!D&!F&!G&!J&K&L&M&!N&!O) |
(A&!B&!C&!D&!E&!F&!G&!H&K&!L&!M&O) | (!A&B&C&D&!F&!G&!I&K&M&!N&!O) |
(A&B&!C&!D&E&!F&!G&!H&K&!L&!M&N) | (!A&B&C&D&!F&!G&!H&!I&K&!L&!M&O) |
(!A&B&C&!D&!E&!F&!G&H&K&L&!M) | (!A&B&C&D&!F&!G&!H&K&L&!M&O) |
(!A&B&C&E&!F&!G&!H&K&L&!M&N) | (!A&B&C&D&!F&!G&H&!I&K&L&!M) |
(A&!B&!C&!D&E&!F&!G&!H&!I&K&L&M) | (!A&B&C&D&!F&!G&!H&K&L&!M&N) |
(!A&B&C&D&!F&!G&!H&!I&K&!L&!O) | (A&!B&!C&!D&!F&!G&!H&I&K&L&!M&N) |
(A&!B&!C&!D&!F&!G&J&K&L&!M&N) | (A&!B&!C&!D&!F&!G&H&J&K&L&!M) |
(A&!B&!C&!D&!F&!G&K&L&!M&N&O) | (!A&B&C&D&!F&!G&!H&K&!L&M&!N) |
(!A&B&C&D&!F&!G&!H&!J&K&!L&!M) | (!A&B&C&D&!F&!G&H&!I&K&!L&M) |
(A&!B&!C&!D&!F&!G&H&I&K&!L&M) | (A&!B&!C&!D&!F&!G&!I&K&L&M&!N) |
(A&!B&!C&!D&!F&!G&H&K&L&M&!O) | (A&!B&!C&!D&!F&!G&!H&K&L&M&!N);
```

FIG. 7

SPECIALIZED ROBOT MOTION PLANNING HARDWARE AND METHODS OF MAKING AND USING SAME

CROSS-REFERENCE TO RELATED APPLICATIONS

The present application is the U.S. National Stage Application of International Application No. PCT/US16/12204, filed Jan. 5, 2016, which claims the benefit of U.S. Provisional Application Ser. No. 62/107,755, filed Jan. 26, 2015, which are hereby incorporated by reference their entirety, including any figures, tables, and drawings.

BACKGROUND

Many of the most exciting applications of computing today are in robotics. Recent advances in robotics have greatly expanded the opportunities for robots to change the way people live. Robots are being developed for a wide spectrum of real-world applications including health care, personal assistance, general-purpose manufacturing, search-and-rescue, and military operations. Unlike traditional robotics applications in which a robot operates in a tightly controlled environment (e.g., on an assembly line where the environment is static and known a priori), these applications require the robot to perform motion planning.

Motion planning is the process of determining how a robot should move to achieve a goal. For example, a robot may wish to move its arm to reach a desired object without colliding with itself or any other object. The ability to perform motion planning to navigate and manipulate objects is critical to dealing with natural environments that are not heavily controlled or engineered. The robot first perceives information about the physical world around it, and then the computer determines how to control the physical robot so that the robot can navigate in this perceived environment.

In many situations, a major constraint on the usefulness of robots is their ability to perform real-time motion planning in environments with obstacles. Motion planning algorithms tend to be computationally intensive, requiring a vast number of collision checks for each movement. Existing techniques for collision detection are generally implemented in software running on one or more general-purpose processors and/or graphics processing units (GPUs). However, running collision detection software on general-purpose processors is insufficiently fast for real-time motion planning and/or is too power-hungry (if using GPUs) for many target applications.

BRIEF SUMMARY

Specialized robot motion planning hardware and methods of making and using same are provided. The described hardware can address the challenge of real-time motion planning. The described systems and methods can take a specific robot and produce a low-power, low-cost hardware architecture capable of performing real-time motion planning for that robot.

The robot motion planning hardware described herein can be designed using a software tool that uses a received robot description for a specific robot and a received scenario description to generate a probabilistic roadmap (PRM). Then, for each edge of the PRM, the software tool produces a design for a collision detection unit for that edge. The collision detection unit is implemented as a circuit that computes whether the motion corresponding to that edge collides with obstacle points or surfaces. The specific robot is defined by its collision geometry, degrees of freedom for each of its joints, and its joint limits; and such information is provided in the robot description. The scenario description can include parameters for a fixed scene, a distribution of obstacles, a distribution of starting robot poses, and a distribution of goal poses.

For a specific robot, a motion planning hardware can be provided that includes a plurality of collision detection units configured to process an input in parallel, each collision detection unit having a circuit for its corresponding edge of a probabilistic roadmap. The circuit can include Boolean logic gates and/or lookup tables. To perform robot motion planning, the robot receives, at its motion planning hardware, data of an environment captured from a sensor system of the robot and data of a goal position, and outputs at each collision detection unit of the motion planning hardware, an indication as to whether an edge of a probabilistic roadmap corresponding to the collision detection unit has a collision with a part of an obstacle identified in the data of the environment. The output of the motion planning hardware is used to remove edges of the probabilistic roadmap that are likely to result in collision in the environment. Then, a graph search of the probabilistic roadmap can be performed to identify a shortest path between the current position of the robot and the goal position along remaining edges of the probabilistic roadmap.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations and examples are described in connection with these drawings, the disclosure is not limited to the implementations and examples disclosed herein.

FIG. 7 is the symbolic text for an example edge configuration generated to feed to the circuit generating software.

DETAILED DESCRIPTION

Specialized robot motion planning hardware and methods of making and using same are provided. The described hardware can address the challenge of real-time motion planning. The described systems and methods can take a specific robot and produce a low-power, low-cost hardware architecture capable of performing real-time motion planning for that robot.

Figure 1A:
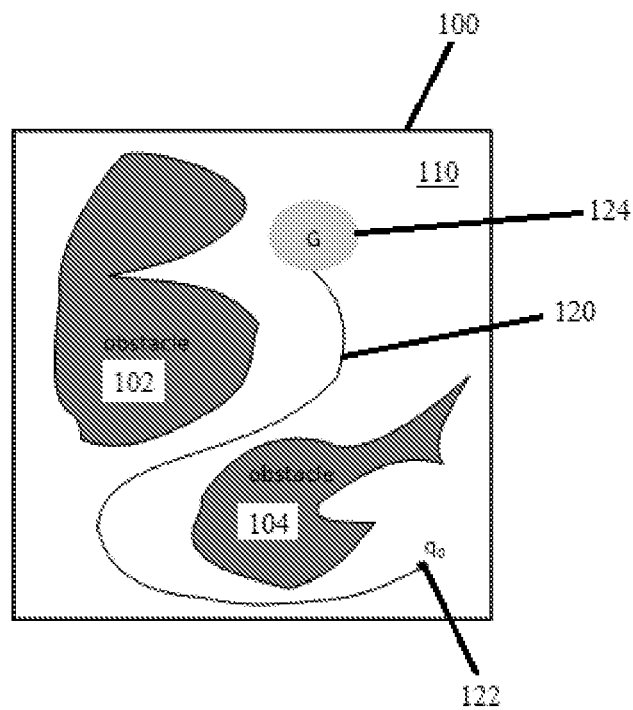
FIGS. 1A-1C illustrate motion planning using a probabilistic roadmap.
Figure 1B:
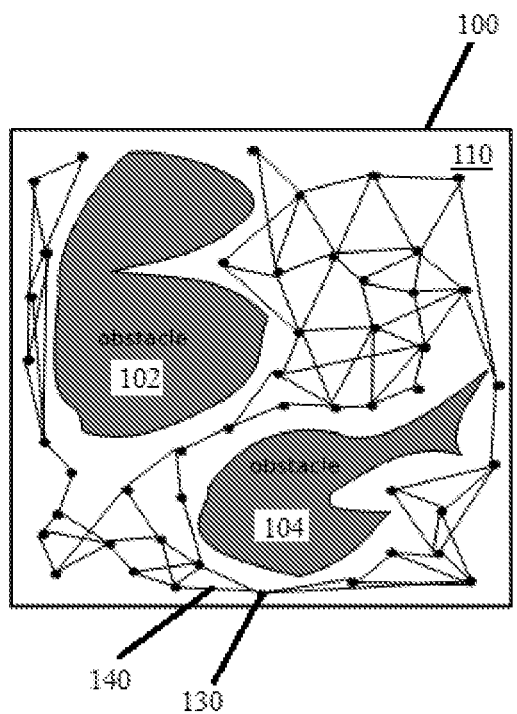
Figure 1C:
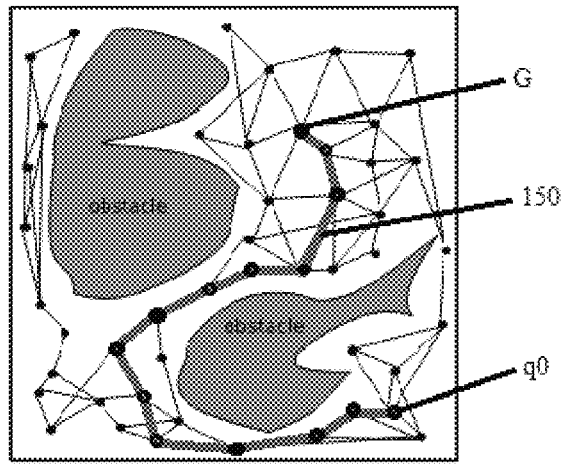

FIGS. 1A-1C illustrate motion planning using a probabilistic roadmap. As mentioned in the background, motion planning refers to the processes used to identify the motions a robot will undergo in order to move from one position to another position until the robot achieves a desired position. Since an articulated robot is formed of a set of rigid bodies connected by joints, motion planning determines the movement from one pose to another pose until a goal pose is met.

The pose of an articulated robot can be described by assigning positions to all of its joints. The space of all such joint positions is called the robot's configuration space (often called C-space), denoted as Q. Some configurations (of the joint positions) in Q would result in a collision with an obstacle in the robot's environment or the robot's own body; the remainder of Q is called free space.

The robot motion-planning problem consists of finding a path through free space from some start configuration $q_0$ to any configuration within a set of goal configurations, G, such as shown in FIG. 1A. Referring to FIG. 1A, a C-space 100 can include obstacle collision regions 102, 104 and free space 110. A path 120 can be found through the free space 110 from a start configuration 122 to a configuration within the set of goal configurations 124.

A common approach to solving motion planning problems is to build a probabilistic roadmap (PRM), such as described by Kavraki et al. in "Probabilistic roadmaps for path planning in high-dimensional configuration spaces," (IEEE Transactions on Robotics and Automation, vol. 12, no. 4, pp. 566-580, August 1996), which is hereby incorporated by reference in its entirety. A PRM consists of a graph where each node is a point in C-space, and a pair of points is connected if a direct movement between them is possible without a collision, such as shown in FIG. 1B. Referring to FIG. 1B, a PRM of nodes 130 and edges 140 (the lines connecting two nodes) is shown in the free space 110 of configuration space 100.

Given a ($q_0$, G) pair, a motion plan can be found by attempting to find a collision-free connection from each node to $q_0$ and G, and then finding a path in the graph between them. This is shown in FIG. 1C, where a path 150 from $q_0$ to G can be found that will be collision-free.

As mentioned above, a PRM is constructed by determining whether a straight-line path between two points in configuration space (representing the direct movement of each of the robot's joints from one position to another) collides with an obstacle, referred to as "collision detection". Collision detection can be carried out by building a geometric model of the swept volume of each robot movement. A swept volume refers to the space (in three dimensions) through which a robot moves when moving from one position to another position.

Figure 2:
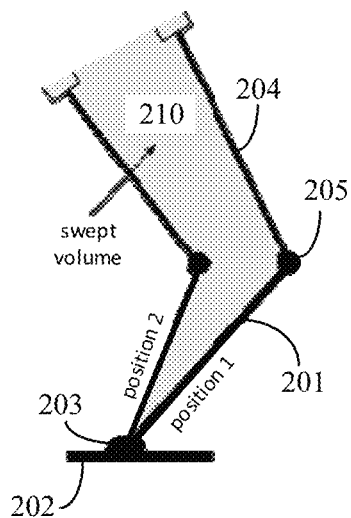
FIG. 2 illustrates a swept volume created by a movement from a first position to a second position.

FIG. 2 illustrates a swept volume created by a movement from a first position to a second position. In the example movement, an arm with a first rigid body 201 connected to a base 202 at a first joint 203 and a second rigid body 204 connected to the first rigid body 201 by a second joint 205 forms a volume, referred to as a "swept volume" 210, as the arm moves between position 1 and position 2.

Figure 3:
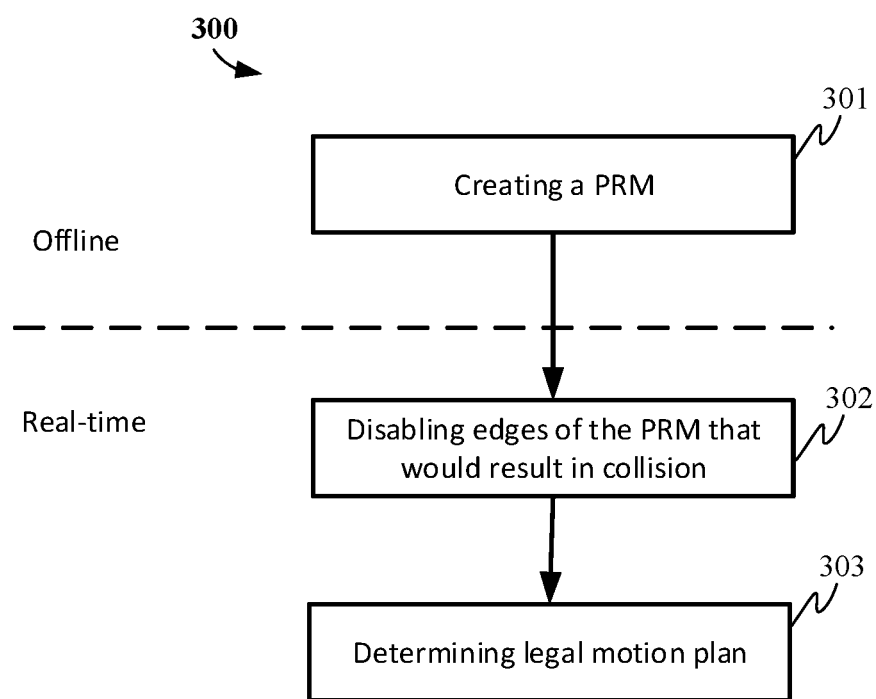
FIG. 3 illustrates an exemplary motion planning process.

FIG. 3 illustrates an exemplary motion planning process. Referring to FIG. 3, the entire motion planning process 300 has two parts: an offline portion and a real-time portion. The initial, offline portion, begins with creating a PRM (301). This step can be carried out before a robot's motion planning hardware is designed, but is specific to a particular robot. To create the PRM in operation 301, nodes are sampled from the robot's C-space and edges are added between sampled nodes if the edges are determined to not cause self-collisions. That is, an edge is not included in the initial PRM graph if, for example, that movement would cause the arm to collide with the robot when the robot moves from the configuration represented by one node to the configuration represented by the other node.

The PRM, which can be stored in the form of a graph data structure, can optionally be pruned (or "trimmed") to remove certain edges based on some utility function. The initial (and optionally pruned) PRM has edges only in free space for a world without obstacles other than the robot itself. This PRM can be stored in a storage system of the robot for use during motion planning. This PRM can be used in the design of the motion planning hardware for that particular robot (described in more detail below).

The PRM created offline (and which can be stored on a storage system of the robot) is then used in real-time, where edges that are not in free space due to obstacles in the perceived environment are disabled (302). During operation of the robot, the robot analyzes and transmits the robot's environment to the motion planning hardware. It should be understood that the environment captured and analyzed by the robot is not necessarily that only in a direct path between the robot's current position and a goal position. A robot may have a valid path only in a circuitous route (and that path may not even be in a total line of sight of the goal pose). The robot can include or communicate with any of a variety of sensor systems through which an environment can be detected and analyzed. For example, the robot can have one or more camera sensors capable of receiving red, green, blue, and depth information (e.g., via infrared). As another example, cameras (or other sensors) may be located at one or more positions in the environment such as on walls, ceilings, floors and/or objects in the environment (like on a table, box, etc.). Environmental information captured from the sensor(s) in the environment can be transmitted to the robot via wired or wireless means.

The data received from the sensor inputs can be analyzed to identify objects in the environment, which can be treated as obstacles. The object identification can be included in the environmental information provided to the motion planning hardware. In some cases, objects are represented by the values of a voxel (e.g., 3D pixel). In another case, objects detected in the environment can be represented as mesh models made out of triangles, where each vertex of a triangle is described with its 3D coordinates. Of course, other representations may be used in certain implementations, such as a probabilistic occupancy grid or an octomap.

Once the environmental information is provided to the motion planning hardware, the motion planning hardware can begin disabling the edges of the PRM that would result in a collision with an obstacle by first detecting collisions of a part of an obstacle (represented in some manner by the robot) with all robot movements in the PRM. For example, an image capture of an environment can identify a lamp (or other object) in the robot's environment. The 3D coordinates for the lamp (or at least its surfaces) can be fed into the hardware for parallel analysis.

In the hardware, a collision detection unit is provided for each edge of the PRM. Each collision detection unit can consider the swept volume as having a single Boolean function that determines whether the swept volume collides with a particular point in 3D space. That is, each collision detection unit can consist of the logic for one Boolean function, F(object_edge), that evaluates to true if a point on the object's surface (as perceived by the sensor system) collides with that robot movement. An example symbolic text of this Boolean function is shown in FIG. 7. The Boolean function has a number of inputs equal to the number of bits used to describe a point in 3D space. In the example implementation, 15 bits are used to describe a point in 3D space (with 5 bits per axis) and therefore 15 inputs are provided to the circuitry for performing the Boolean function.

For typical environments and applications, the coordinates describing a point in 3D space do not have to be specified extremely finely. Robotic motion planning has less stringent requirements than physics simulations that determine whether two objects will collide; the physics simulation needs to know exactly whether the objects collide, whereas robotic motion planning simply needs to avoid collisions, even if this is done conservatively (e.g., eliminating a path out of conservatism, even if that path might potentially be collision-free). By being conservative in predicting when two objects will collide, calculations may be performed with few numbers of bits. For example, calculations can be performed with 5-bit fixed-point arithmetic instead of far more expensive 32-bit floating point arithmetic. To illustrate how the lower resolution remains sufficient for typical environments, consider a robot with arms that can navigate around a 1 m$^3$ box. With only, 5 bits to describe a coordinate, a point's position in each dimension can still be resolved down to 1 m/$2^5$, which is about 3.1 cm.

Once collision detection has been performed, the edges of the PRM that would result in a collision if the robot were to move between the node pairs connected by those edges can be disabled using the outcome of collision detection. For example, the output of each collision detection unit can be a single bit, a flag, or other indicia as to whether there is or is not a collision between the edge represented by that collision detection unit and a portion of an obstacle. The output of the motion planning hardware is used to remove edges of the probabilistic roadmap that are likely to result in collision in the environment.

By removing edges likely to cause a collision, the remaining edges can be used to determine a legal motion plan (304). For example, the robot can determine a legal motion plan by identifying an edge of a graph data structure of the probabilistic roadmap as being valid if the circuit corresponding to that edge indicates that there is no collision. Then, a graph search can be performed on the graph. The motion planning hardware processor or the software running on the robot can select a path using the valid edges (indicated as collision-free from the output of the collision detection units). For example, Dijkstra's shortest path algorithm can be used, or the Bellman-Ford algorithm can be used.

As illustrated in FIG. 3, a portion of the motion planning process 300 is preliminarily carried out offline so that decisions with respect to motion planning can be made real-time while a robot is operating in an environment. This real-time decision making capability for motion planning is due to the use of the special robot motion planning hardware.

Figure 4:
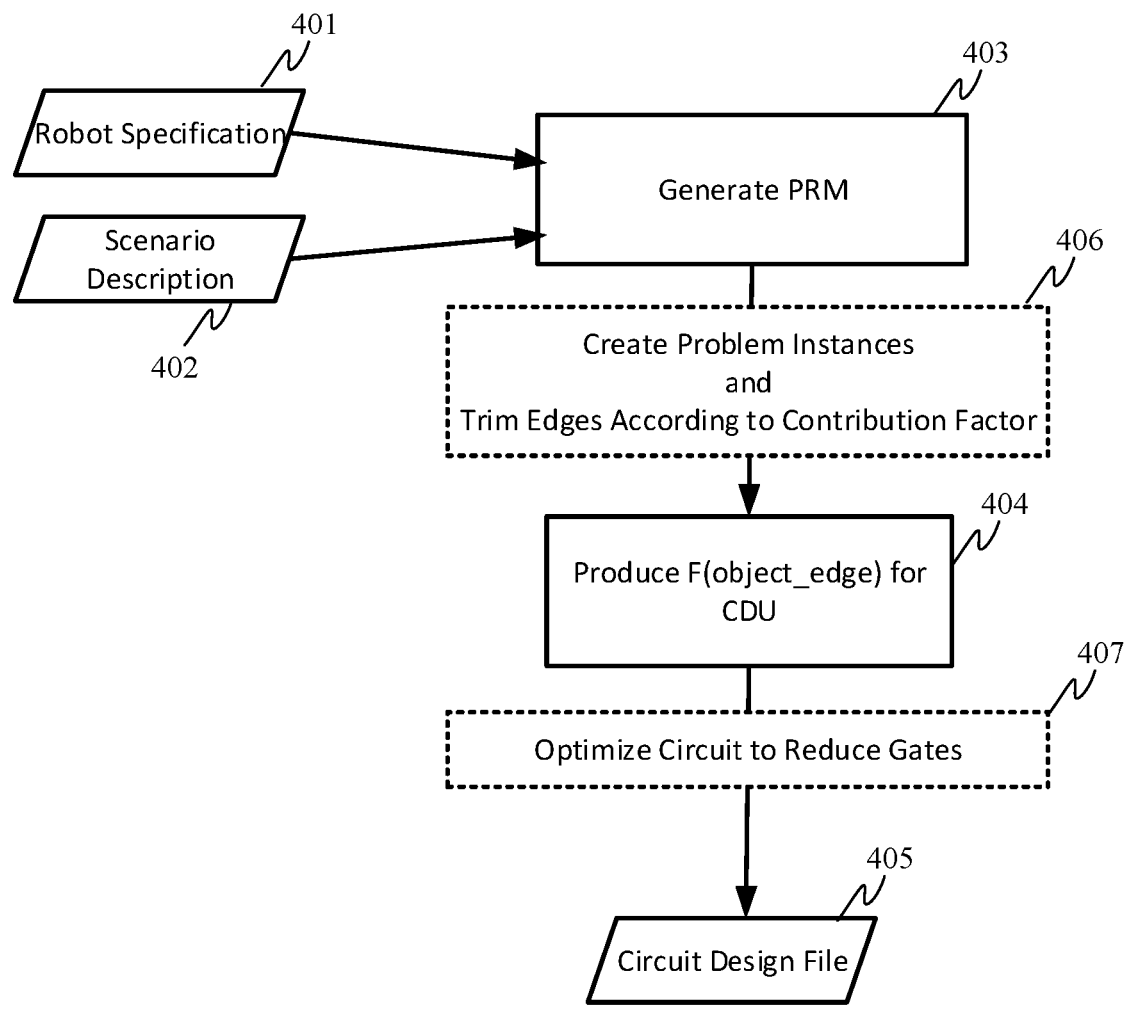
FIG. 4 illustrates a process for generating a motion planning hardware design that may be carried out by a software tool executing on a computing device.

FIG. 4 illustrates a process for generating a motion planning hardware design that may be carried out by a software tool executing on a computing device (such as a general purpose computer). The robot motion planning hardware described herein can be designed using a software tool that uses a received robot description for a specific robot 401 and a received scenario description 402 to generate a PRM (403). Then, for each edge of the PRM, the software tool produces a design for a collision detection unit for that edge (404). An example design produced for a collision detection unit for an edge is shown in FIG. 7. The collision detection unit is a circuit, composed of logic gates and/or lookup tables, that detects a collision between an edge in the PRM (corresponding to a swept volume) and a part of an obstacle (expressed as, for example, a 3D point in space) present in the environment. The software tool can output a circuit design file 405 describing the circuitry of the collision detection units. The circuit design file 405 may be embodied in a variety of file formats depending on the implementation so that the file is suitable for being used to program a field programmable gate array (FPGA), for being used directly or indirectly in a layout software for integrated circuit fabrication, or for being used in conjunction with other design software used to create a hardware processor.

Through the two inputs of robot description 401 and scenario 402, the motion planning hardware design takes into consideration, and can accommodate, a wide range of possible robots and classes of environments.

The specific robot is defined by its collision geometry, degrees of freedom for each of its joints, and its joint limits; and such information is provided in the robot description 401. In some cases, the robot description 401 can be provided in the form of an industry-standard Unified Robotic Description Format (URDF) file. The URDF file specifies the collision geometry of the robot, its display geometry (these are often different for the purposes of visualization), and the degrees of freedom for each joint, along with joint limits, and can almost always be obtained from the robot manufacturer. Of course, other standardized forma now or later known may be used.

Because the motion planning hardware is designed for a specific robot, an efficient processor can be achieved. Some of this efficiency arises because motion planning hardware does not need to perform general motion planning for an arbitrary robot. For example, if a scenario involves a robot with two arms that are each 3 feet long, the processor needs to plan motions for just those two specific arms and does not need to consider objects farther than 3 feet from the robot. Furthermore, by tailoring the processor to a specific robot, many expensive (e.g., high power usage or slow speed) calculations can be performed offline, prior even to processor design. For example, results of equations that depend solely on the robot itself (e.g., calculations to determine whether moving one robot arm will cause a collision with the other robot arm) can be pre-computed and the results of these pre-computations embedded in the processor. The ability to perform these calculations offline avoids having to perform these time-intensive and/or processing intensive computations in the field.

The scenario description 402 can include parameters for a fixed scene (e.g., floor, wall, workspace size, a desk at a certain height), a distribution of obstacles (locations, sizes, and shapes), a distribution of starting robot poses, and a distribution of goal poses. As used herein, "scenario" refers to a class of environments, such as "desk with objects on it" or "bookshelf with objects on it". A scenario includes distributions of the number of obstacles and their locations, sizes, and shapes. A scenario also includes distributions of robot starting poses and goal poses with positions of various robot parts. At any given time, the robot needs to perform motion planning for one task drawn from one scenario. For example, if the scenario is "3-foot high desk with objects on it"—with given distributions of the number of obstacles, obstacle locations, obstacle sizes/shapes, and robot start and goal poses—it is expected that the robot does not need to be able to move its arm beneath the table. As another example, in many scenarios, it is unlikely that the robot needs to be able to move its arm behind itself. This a priori knowledge of the scenario conserves resources (and dedicates more hardware) for solving the expected motion planning problems. If more than one scenario is possible in a given environment, then a composite scenario that is effectively the union of the possible scenarios is utilized or the robot motion planning hardware is reconfigured when the scenario changes.

The software tool can perform certain optimizations to output a design that is compact enough to fit, for example, on a FPGA, but is also highly likely to produce plans for problems drawn from the scenario. It should be understood that implementations of the robot motion planning hardware can be implemented as an application-specific integrated circuit (ASIC), a FPGA, or other circuitry.

For example, the software tool can optionally trim edges from the PRM generated in step 403 to reduce the total number of edges in the PRM. This optional process (406) can include creating problem instances and trimming the edges according to a contribution factor. The contribution factor is the extent to which an edge in the initial PRM contributes to finding the minimum solution path for a problem instance. If an edge is not frequently or ever involved in the minimum solution path, then it could be removed.

In some cases, the scenario description from the scenario description 402 is used to generate a plurality of concrete problem instances. The number of problem instances can be selected based on the tolerance for failure to find a path in a PRM. For example, tens, hundreds, thousands or more of problem instances may be generated. A problem instance refers to a scene/obstacle/start/goal tuple generated from the scenario description in the scenario description 402. The problem instance indicates a motion planning problem that satisfies the constraints of a given scenario. For each problem instance, that instance is evaluated to determine the extent to which each edge in the PRM contributes to finding the minimum solution path (e.g., the usefulness of the edge defined by the estimated probability that the edge is necessary for solving a problem drawn from the scenario). In effect, the software tool runs a simulation of the motion planning hardware using an environment/scenario described by each problem instance.

In one case, the trimming of the edges can be based on the average contribution of an edge so that those edges that meet or exceed a threshold are kept and those that don't are removed. In another case, the edges can be ranked by average contribution and only the top ten, hundred, thousand or other number of edges are kept (the amount of the edge budget for the processor). In many cases, the least "useful" edges can be iteratively removed until a total edge budget is reached. Available algorithms that sparsify and prune roadmaps without any background task knowledge can also be incorporated. Although the trimming process can be very computationally expensive, it need only occur once per robot/scenario pair, and is performed offline.

If the points in C-space are sampled randomly, the use of PRM is probabilistically complete. As the algorithm samples more points in C-space, the probability of finding a path solution tends to 1. However, by fixing the PRM in the processor design, particularly when given a fixed budget of hardware and PRM edges, it is possible to encounter a situation where no path solution can be found. To minimize this occurrence when using a fixed PRM processor design, the processes that generate the PRM (e.g., the software tool) can incorporate simulations of sample motion planning problems that satisfy the constraints of a given scenario. In addition, scenario-specific sampling strategies can be incorporated. For example, samples that are expected to be helpful in a particular scenario (such as indicating to sample right above a desk for a task that may involve an action on or near a desk) can be specifically incorporated. These simulations are described with respect to optional process 406.

Another optimal optimization can include reducing the number of gates implementing a collision detection unit (407). For example, Boolean minimization can be used.

In one implementation, the Klampt open-source software for modeling robotic motion is used to produce a robot- and scene-specific PRM (in operation 403). This PRM can be optimized to fit on an FPGA using the optimizing steps 406 and/or 407. As mentioned above, once the PRM has been trimmed (e.g., in process 406), the trimmed PRM can be used to produce a set of collision detection unit circuits (as described in operation 404). The collision detection unit circuits can then be optimized to reduce the number of gates (407) using Boolean minimization (e.g., with an ESPRESSO logic minimizer). The FPGA can be configured (and reconfigured) for a desired robot/scenario pair based on the design produced by the software tool.

There are a number of additional optimizations that can be carried out during the time of steps 406 and/or 407. For example, strategic sampling of a robot's C-space can be included to further optimize design. Typical algorithms choose points at random so as to provide probabilistic guarantees about being able to find paths. However, certain implementations strategically sample points in the C-space to minimize the hardware necessary to perform collision detection and/or take advantage of a specific robot's expected scenario. Given a fixed hardware and power budget, a larger PRM (with more samples and thus more motion options) can be represented in the hardware if the collision detection units are smaller and consume less power. To reduce the size and power of collision detection units, it was observed that not all robot motions will have equal-sized circuits for determining collisions with objects/obstacles. Therefore, it is possible to choose points in C-space so as to obtain swept volumes whose circuits are more amenable to local logic minimization (i.e., require smaller circuits). Furthermore, it is possible to choose points in C-space so as to facilitate global logic optimization across collision detection units. As in the example illustrated in FIG. 7 below, 15 bits can be used to describe the point in 3D space, which implies a truth table with $2^{15}$ entries. Since most of these truth tables will be sparse, the Boolean function can be efficiently computed (e.g., using bounding boxes for the swept volume) and can be expected to result in relatively small circuits (when optimized using, for example the ESPRESSO logic minimizer). Indeed, experimentally, it was found that most truth tables can be optimized down to only dozens of logic gates.

Beyond locally optimizing the logic for each collision detection unit (e.g., by using ESPRESSO), it is possible to globally optimize across collision detection units. Many movements will have truth tables that are similar, and this similarity can be exploited to optimize globally. Preliminary experiments with ESPRESSO and a very simple robot arm in 3-space found that many common sub-expressions can be factored out for global optimization. Although the experimental configuration is limited to optimizing across 16 collision detection units (due to the ESPRESSO logic minimizer used in the experiments), global optimization can be carried out across any number of collision detection units in practice Another opportunity for strategic sampling (and thereby optimization) targets the case where the scenarios the robot will face are known, in the form of distributions over start points, goals, and obstacles. For example, in many scenarios, the robot is much more likely to be asked to generate a plan to position its gripper in the workspace in front of it than in the area just above and behind its own shoulder. Similarly, in many scenarios, obstacles are much more likely to appear in the workspace area, or on the far sides of the workspace area, than directly in front of the robot's elbows. In some scenarios, obstacles are likely to be small, and in others they are likely to be large. This kind of coarse prior information about scenarios is easy to describe in many real-world applications. With this scenario information, we can place our samples adaptively to, for example, provide sparser coverage of configurations that have the robot's arm behind its shoulder.

Figure 5:
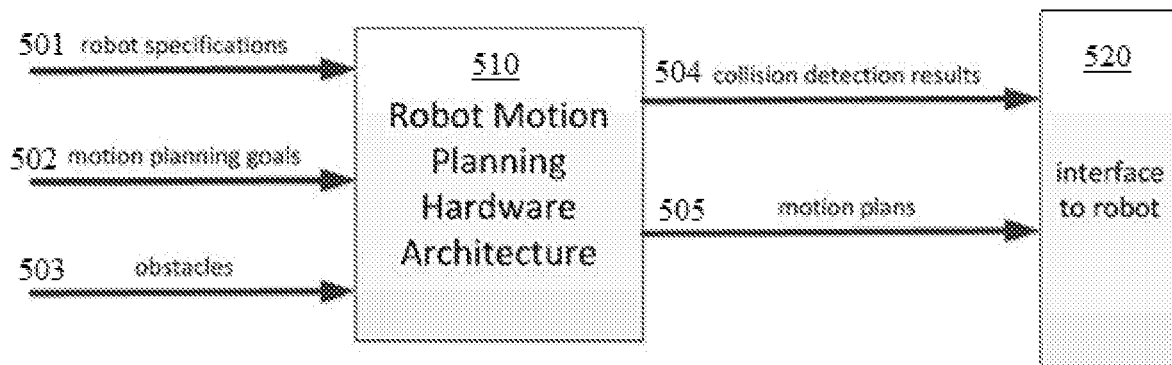
FIG. 5 illustrates a high level overview of a robot motion planning hardware architecture.

FIG. 5 illustrates a high level overview of a robot motion planning hardware architecture. Referring to FIG. 5, the high level architecture 500 for motion planning involves robot specifications 501, motion planning goals 502, obstacle data 503, collision detection results 504, and motion plans 505. In particular, a robot motion planning hardware 510 uses robot specifications 501, motion planning goals 502, and obstacle data 503 to generate collision detection results 504 and motion plans 505. As discussed above, the robot specifications 501 (and even motion planning goals 502) can be used offline to generate the hardware used in real-time motion planning. The output of the robot motion planning hardware 510 can be provided to the robot via an interface 520 so that the robot can act on the motion plans 505.

Figure 6:
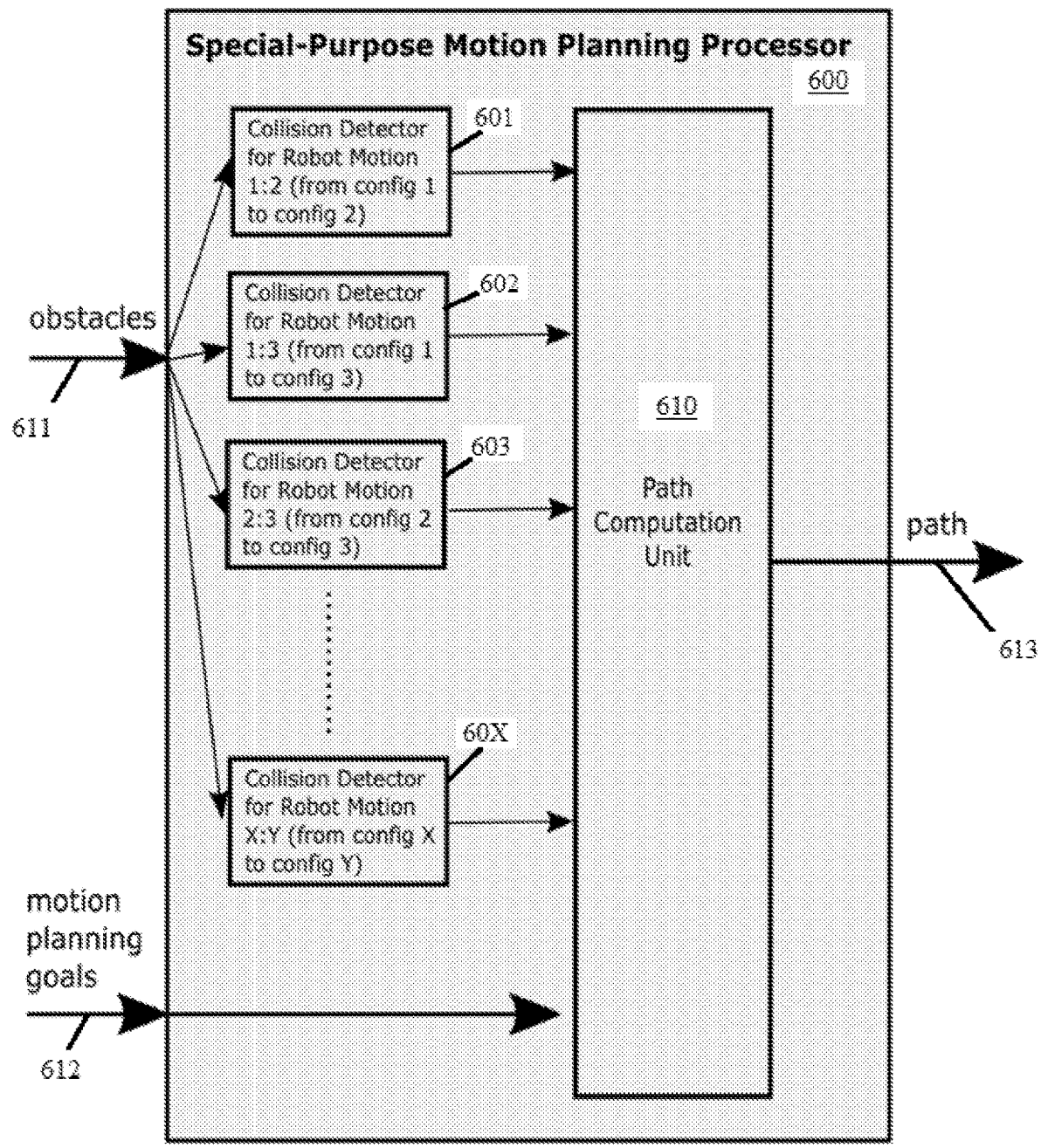
FIG. 6 is a high level schematic of an example motion planning hardware.

FIG. 6 is a high level schematic of an example motion planning hardware. A robot motion planning hardware can be a special-purpose motion planning processor 600. The motion planning processor includes a collision detection unit (e.g., 601, 602, 603 . . . , 60X) for every possible motion of the robot (or at least every motion in the PRM produced by the software tool) and a path computation unit 610.

The processor's inputs describe the obstacles 611 in the environment and the path goals (motion planning goals) 612. The obstacle information 611 is received by the collision detection units. In a preferred embodiment, all of the collision detection units run in parallel. However, in some implementations, the collision detection units may be time-multiplexed to serve multiple robot motions. The motion planning goals 612 and the output of the collision detection units 601, 602, 603 . . . , 60X are provided to the path computation unit 610, which performs a graph search to identify the path used to achieve a goal. The processor's outputs are the path 613 and, optionally, collision detection information.

Referring to FIG. 6, for a specific robot, a motion planning hardware can be provided that includes a plurality of collision detection units configured to process an input in parallel, each collision detection unit having a circuit, with logic gates and/or lookup tables, for its corresponding edge of a probabilistic roadmap. To perform robot motion planning, the robot receives, at its motion planning hardware, data of a goal position and data of an environment captured from a sensor system of the robot, and outputs at each collision detection unit of the motion planning hardware, an indication as to whether an edge of a probabilistic roadmap corresponding to the collision detection unit has a collision with a part of an obstacle identified in the data received. The output of the motion planning hardware is used to remove edges of the probabilistic roadmap that are likely to result in collision in the environment. Then, a graph search of the probabilistic roadmap can be performed to identify a shortest path along remaining edges of the probabilistic roadmap.

Additional inputs to the collision detection circuits may be included, for example to handle certain robot motions such as, but not limited to, grasping, gripping, pushing, moving, and a combination thereof. Depending on the robot specifications, certain actions may be carried out via various parts of the robot body. The possible robot motions can be modeled and incorporated into the hardware design. For example, for a case where a specific robot can grasp an object and move with the object (such as in the common "pick-and-place" task), the object in the robot's grasp may be modeled very coarsely as a cube. Then, the processor can be configured to activate one of a plurality of object sizes contained in each hand. This would add a small number of inputs to the collision detection circuit, but greatly enhance the flexibility of the planner.

Most of the computational effort required for motion planning involves detecting whether a motion will lead to a collision. As previously mentioned, collision detection is computationally expensive. However, by performing certain processes in parallel using the described motion planning hardware, it is possible to simultaneously detect collisions for a large number of robotic motions against a large number of obstacles.

Advantageously, the motion planning hardware does not require the general-purpose hardware that is found in general-purpose CPUs or GPUs because the motion planning hardware does not need to fetch and decode instructions, perform IEEE-754-compliant floating point arithmetic, or a wide variety of other features that consume hardware and energy in general-purpose processors. Indeed, since the precision needed to achieve motion planning goals is known a priori, the hardware can be tailored to perform operations at exactly that granularity, even if it happens to be an unusual width (e.g., 9-bit fixed point).

FIG. 7 is the symbolic text for an example edge configuration generated to feed to the circuit generating software. In FIG. 7, the logic for a single edge is shown. In this example case, a part of an obstacle (expressed as a 3D point in space) found to have a likelihood of colliding with that edge is represented by five bits for the x-axis, five bits for the y-axis, and five bits for the z axis for a total of 15 bits. Each bit has two possible values: one represented by the letter (e.g., A) and the other represented by the not-letter (e.g., !A). There are 70 collisions reflected in the symbolic text. The circuit generating software then uses AND, OR, NOT, NAND, and NOR gates and/or lookup tables to implement the symbolic text. In some cases, the number of gates can be optimized (reduced) by transforming some or all of the gates into NOR or NAND logic.

Figure 8:
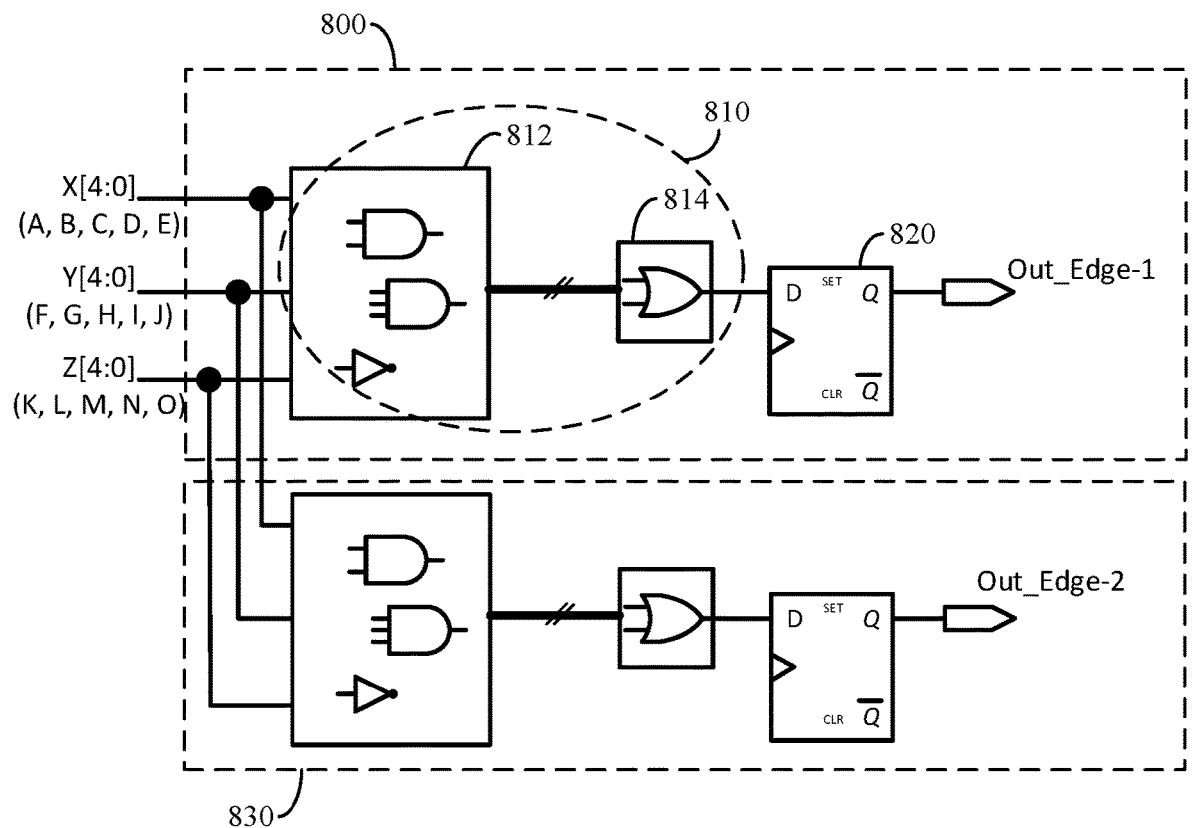
FIG. 8 illustrates a portion of an example generated circuit for robot motion planning hardware.

FIG. 8 illustrates a portion of an example generated circuit for robot motion planning hardware. Referring to FIG. 8, a motion planning hardware edge logic, such as the edge logic for Edge-1 800 can include a Boolean circuit 810 with logic gates 812 representing each of the parts of an obstacle that a single edge (swept volume) would collide with and OR gate(s) 814 ORing the Boolean logic representations of the parts of obstacles, such as described by the symbolic text of FIG. 7, to output a single bit. A flip-flop 820 may be included to store the value of the single-bit output of the Boolean circuit 810 so that the appropriate value can be read at the output when needed. The edge logic is provided for each edge (e.g., edge logic for Edge-1 800 and edge logic for Edge-2 830) so that when an input representing a part of an obstacle is received, the motion planning hardware edge logic for all edges can process that input in parallel.

Figure 9:
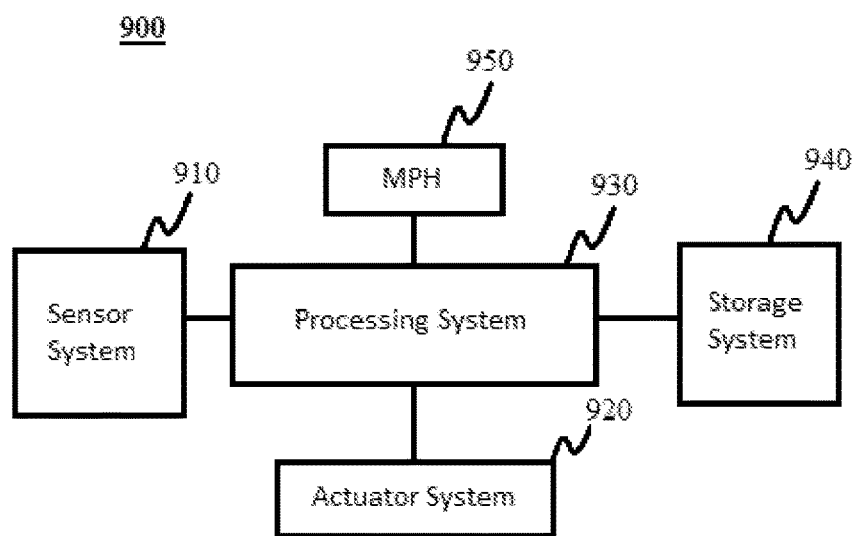
FIG. 9 shows a block diagram of an example robot that can incorporate the robot motion planning hardware described herein.

FIG. 9 shows a block diagram of an example robot that can incorporate the robot motion planning hardware described herein. Referring to FIG. 9, a robot 900 can include a sensor system 910, an actuator system 920, a processing system 930, a storage system 940, and robot motion planning hardware 950. Although not shown, robot 900 can include a power system for supplying power, as needed to the various components. Batteries may be used or the power system may include wired (e.g., an ac adaptor and plug) and wireless means (e.g., using transducers and charge storage devices) for supplying power. It should be understood that robot 900 can include other systems and components not shown in the figure and that such systems and components have been omitted from the drawing for simplicity.

The sensor system 910 can be any suitable sensor system through which an environment can be detected and analyzed. Example sensor systems include, but are not limited to, optical, microwave, acoustic and other sensors in the form of video cameras, image sensors, infrared sensors, ultrasound transceivers, microphones, force sensors, capacitive sensors, accelerometers, gyroscopes, and temperature sensors. Sensor system 910 can include hardware for some processing of a signal from a sensor and/or control of that sensor. Sensor system 910 can include components that may be local to the robot and components that may be remote from the robot. For example, in some cases sensor system 910 may include sensors that can be located in an environment, the output of which may be analyzed locally at the robot or analyzed remote from the robot and communicated to the robot for use in motion planning (among other applications that can be available). In some cases, one or more of the sensors of sensor system 910 are positioned on the robot itself.

Actuator system 920 can include actuators and motors for moving parts of the robot. Actuator system 920 can involve pneumatic, electric, thermal, magnetic or mechanical actuation as some examples.

Processing system 930 can include one or more processors to transform or manipulate data according to the instructions of software stored on the storage system 940. Examples of processors of the processing system 930 include general purpose central processing units, application specific processors, and logic devices, as well as any other type of processing device, combinations, or variations thereof. The processing system 930 may be, or is included in, a system-on-chip (SoC) along with one or more other components such as network connectivity components, sensors, video display components, and the like.

Storage system 940 may include volatile and nonvolatile, removable and non-removable media implemented in any method or technology for storage of information, such as computer readable instructions, data structures, program modules, or other data. Examples of storage media of storage system 940 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium (or media) a propagated signal or carrier wave. Storage system 940 may be implemented as a single storage device but may also be implemented across multiple storage devices or sub-systems co-located or distributed relative to each other. Storage system 940 may include additional elements, such as a controller, capable of communicating with processing system 930.

Various software applications and data may be stored on the storage system 940. For example, the robot operating system can be stored on the storage system 940. In some cases, one or more probabilistic roadmaps can be stored in a graph data structure on the storage system 940.

Robot motion planning hardware 950 is a special purpose hardware based on the specifications of robot 900. The motion planning hardware 950 can be designed and embodied, for example, as described with respect to FIGS. 4-6. In some cases, robot motion planning hardware 950 can be embodied on a FPGA or as an ASIC. In some cases, the motion planning hardware 950 can include sub-systems of the storage system 940.

Example Implementation

A motion planning processor was designed for a 6-degree JACO-2 arm from Kinova. The sensor system for the robot involves multiple Kinect-2 modules to enable a visualization of the environment. For the example implementation, a motion planning processor was designed specifically for the control of the arm and connected to the robot through an I/O port of the robot. The Robot Operating System (ROS) software ecosystem, available from the Open Source Robotics Foundation, was used for controlling the robot and interfacing to the motion planning processor. The ROS ecosystem is used to interpret objects in the environment from the output of the Kinect-2 modules and the representations generated by the ROS software running on the robot are communicated to the motion planning processor.

With local and/or global optimization (such as described with respect to FIG. 4), it was found that on the order of 5000 collision detection units were possible to fit on a high capacity FPGA. In addition, it was possible to stream 3D points (identifying parts of obstacles) taken directly from the Kinect-2 modules (without much further processing) into the processor, further optimizing the hardware.

Example Alternative Implementation

For a mesh model/triangle implementation, since each triangle has three vertices, each vertex can be described with its 3D coordinates.

In a case where collision detection units include circuitry for computing triangle collisions, a robot can stream object triangles to the motion planning hardware and collision detection units configured to detect whether robotic movements would cause collisions with these object triangles. In this example implementation, each collision detection unit is responsible for one edge in the graph, which represents one possible robot movement. The robot movement corresponds to a volume in 3D-space that is swept in the course of performing that movement. Here, the collision detection unit can represent the swept volume as a hull consisting of triangles and can store nine k-bit numbers for each triangle. Then, to detect collisions with an incoming object triangle, the collision detection unit performs several computations to determine whether triangles intersect each other. For example, the collision detection unit can compare each object triangle edge against each robot triangle and compare each robot triangle edge against each object triangle. Each comparison between a robot triangle and an object triangle involves a significant amount of computation, including dot-products and cross-products. For a case where 24 dot products and 7 cross products are performed, the hardware uses 114 multipliers and 69 adders. This implementation can be optimized to reduce the computation to a single comparison (one-direction instead of the two direction comparison) by imposing constraints on triangles—a minimum length of robot triangle edges and a maximum length of obstacle edges.

It is estimated that about 100 of these collision detection units with swept volume mesh triangle storage, multipliers, and adders can be fit to a modern high-capacity FPGA. Since this number is far fewer than the number of edges in the graph, the large-size collision detection units are suitable for robots having more processing capability than found in modern high-capacity FPGAs (or in environments that can use a roadmap with fewer than 100 edges). Where time-multiplexing is used to increase the number of such collision detection units, memory bandwidth would need to be sufficient to handle the context switch between states of the edges so that the new edge's triangle state can be read in fast enough.

It should be understood that the examples and embodiments described herein are for illustrative purposes only and that various modifications or changes in light thereof will be suggested to persons skilled in the art and are to be included within the spirit and purview of this application. One skilled in the art will readily appreciate that the present invention is well adapted to carry out the objects and obtain the ends and advantages mentioned, as well as those inherent therein. The present examples along with the methods described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. One or more non-transitory computer readable storage media having instructions stored thereon that, when executed by a computing system, direct the computing system to at least:
    receive a robot description comprising a collision geometry of a robot;
    generate a graph using at least the robot description, the graph comprising a plurality of nodes and a plurality of edges that couple respective pairs of the nodes, wherein the nodes represent respective configurations of the robot, and wherein each of the edges represents a respective possible movement between a respective pair of configurations represented by the nodes coupled by the respective edge; and
    for each edge of the graph, produce a respective collision detection unit comprising a distinct circuit operative to receive input based on a scenario description that represents one or more objects in an environment in which the robot operates and, in response to the input, to detect whether a portion of the robot will collide with any of the one or more objects in the environment in moving between the pair of configurations represented by the nodes coupled by the respective edge.

2. The one or more non-transitory computer readable storage media of claim 1, wherein each distinct circuit of each collision detection unit is defined to include an OR circuit, for a corresponding edge, the OR circuit which performs an OR operation on representations of any of the one or more objects to which that edge can collide.

3. The one or more non-transitory computer readable storage media of claim 2, further comprising instructions that direct the computing system to: optimize the OR circuit to reduce number of gates forming the OR circuit.

4. The one or more non-transitory computer readable storage media of claim 1, wherein the scenario description comprises: a fixed scene, a distribution of obstacles, a distribution of starting robot poses, and a distribution of goal poses.

5. The one or more non-transitory computer readable storage media of claim 4, further comprising instructions that direct the computing system to at least:
    before producing the collision detection unit for each edge, trim a number of edges or nodes from the graph, wherein the instructions to trim the graph direct the computing system to at least:
    generate a plurality of problem instances using a tuple of the fixed scene, a selected number of obstacles from the distribution of obstacles, a selected starting robot pose of the starting robot poses, and a selected goal pose from the distribution of goal poses;
    for each problem instance, evaluate a contribution factor of each edge with respect to finding a minimum solution path; and
    remove edges of the graph based on the contribution factors of those edges.

6. The one or more non-transitory computer readable storage media of claim 1, wherein the robot description comprises a Unified Robotic Description Format (URDF) file.

7. The one or more non-transitory computer readable storage media of claim 1, wherein the graph is a probabilistic roadmap.

8. The one or more non-transitory computer readable storage media of claim 1, wherein the circuit of the collision detection unit comprises: logic gates, lookup tables, or both logic gates and lookup tables.

9. The one or more non-transitory computer readable storage media of claim 1, wherein the robot has at least one joint, and the instructions to generate the graph using the robot description and the scenario description cause the computing system to generate a probabilistic roadmap (PRM) using the robot description comprising: i) the collision geometry of the robot, ii) degrees of freedom for each joint of the robot, and iii) a number of joint limits of the robot.

10. The one or more non-transitory computer readable storage media of claim 1, wherein each distinct circuit of each collision detection unit is arranged in parallel with at least one other distinct circuit of at least one other collision detection unit, wherein the parallel circuits receive the same input simultaneously.

11. A method of motion planning of a robot operating in an environment, the method comprising:
    storing a graph data structure comprising a plurality of nodes and a plurality of edges that couple respective pairs of the nodes, wherein the nodes represent respective configurations of the robot, and wherein each of the edges represents a respective possible movement between a respective pair of configurations represented by the nodes coupled by the respective edge;
    receiving, by motion planning hardware, data of the environment, the data having been captured by a sensor system and including a number of parts of a number of obstacles in the environment, wherein the motion planning hardware comprises a plurality of distinct collision-detection circuits, each of the collision-detection circuits corresponding to a respective edge of the graph data structure;

in response to receipt of the data, outputting, by each of the collision-detection circuits, a respective edge-specific determination regarding any collision of the robot with any of the parts of the obstacles;

in response to each edge-specific determination, removing the respective edge of the graph data structure for which the respective edge-specific determination indicates a collision with any of the parts of any of the obstacles; and determining a legal motion plan for the robot based on selection of edges of the graph data structure that remain after removal of edges in response to the edge-specific determinations.

12. The method of claim 11, wherein determining the legal motion plan comprises:

performing a search of the graph data structure for a shortest path between a current position of the robot and a goal position along edges of the graph data structure remaining after removing the edges of the graph data structure that are indicated, by the motion planning hardware, as having the collision with the part of the obstacle.

13. The method of claim 11, wherein each of the collision-detection circuits comprises a Boolean circuit, wherein the data comprises 3D points that represent the parts of the obstacles in the environment, the method comprising:

for each 3D point of the 3D points that represent the parts of the obstacles, processing that 3D point in parallel through each Boolean circuit, each Boolean circuit receiving the 3D point and outputting a Boolean value that indicates detection of the collision or an absence of indication of a collision for the edge corresponding to that Boolean circuit; and wherein removing the respective edges of the graph data structure comprises:

for any edge for which the corresponding Boolean value indicates detection of the collision, removing that edge from the graph data structure.

14. The method of claim 11, wherein in receiving the data of the environment, the plurality of distinct collision-detection circuits receive the data of the environment simultaneously.

15. A motion planning hardware apparatus for controlling a robot, the hardware apparatus comprising:

a memory circuit arranged to store a graph comprising a plurality of nodes and a plurality of edges that couple respective pairs of the nodes, wherein the nodes represent respective configurations of the robot, and wherein each of the edges represents a respective possible movement between a respective pair of configurations represented by the nodes coupled by the respective edge;

a plurality of distinct collision-detection circuits arranged to process an input in parallel, each collision-detection circuit corresponding to an edge of the graph;

wherein the input represents one or more objects in an environment in which the robot operates; and wherein each of the plurality of collision-detection circuits is operable, in response to the input, to detect whether a portion of the robot will collide with any of the one or more objects in the environment in moving between the pair of configurations represented by the nodes coupled by the respective edge.

16. The motion planning hardware apparatus of claim 15, wherein the collision-detection circuit comprises an OR circuit combining a representation, for each edge, of 3D points to which that edge can collide.

17. The motion planning hardware apparatus of claim 15, wherein each collision-detection circuit takes, in parallel, a same 3D point represented by a set of bits and returns a 1 or a 0 to indicate a collision or a not collision, respectively, with that 3D point.

18. A robot comprising:
a sensor system;
an actuator system;
a processing system;
a storage system arranged to store a graph data structure comprising a plurality of nodes and a plurality of edges that couple respective pairs of the nodes, wherein the nodes represent respective configurations of the robot, and wherein each of the edges represents a respective possible movement between a respective pair of configurations represented by the nodes coupled by the respective edge; and a robot motion planning hardware comprising a set of distinct collision-detection circuits, each collision-detection circuit corresponding to each edge of the graph data structure, each collision-detection circuit being operative to receive input based on a scenario description that represents one or more objects in an environment in which the robot operates and, in response to the input, to detect whether a portion of the robot will collide with any of the one or more objects in the environment in moving between the pair of configurations represented by the nodes coupled by the respective edge.

19. The robot of claim 18, wherein in operation:
at least a portion of the scenario description is provided by the sensor system, the scenario description comprising 3D points that represent a number of parts of a number of obstacles in the environment, and for each 3D point of the 3D points that represent the parts of the obstacles, each of the collision-detection circuits of the robot motion planning hardware process that 3D point in parallel with the other collision-detection circuits of the set to output an indication of a collision or an indication of not a collision with that 3D point for the edge corresponding to that collision-detection circuit.

20. The robot of claim 19, wherein the processing system is operative to identify an edge of the graph data structure as being valid if the collision-detection circuit corresponding to that edge outputs the indication of not the collision; and performs a graph search of the graph data structure for a shortest path comprising edges indicated as being valid.

21. The robot of claim 20, wherein the graph data structure is a pre-computed graph data structure.

22. The robot of claim 18, wherein the collision-detection circuit corresponding to each edge of the graph data structure comprises logic gates.

23. The robot of claim 18, wherein the collision-detection circuit corresponding to each edge of the graph data structure comprises lookup tables.

24. The robot of claim 18, wherein the robot motion planning hardware further comprises a path computation system, wherein the path computation system is operative to at least:

receive data of a goal configuration and collision detection results output from the set of collision-detection circuits, and selects a path based on the graph data structure from a current configuration of the robot to the goal configuration using valid edges indicated in the collision detection results.

25. The robot of claim 18, wherein the set of distinct collision-detection circuits are arranged to receive the same input simultaneously.

\* \* \* \* \*